United States Patent
Ryu et al.

(10) Patent No.: US 12,230,831 B2
(45) Date of Patent: Feb. 18, 2025

(54) STRETCHING APPARATUS FOR MANUFACTURING SEPARATOR AND METHOD OF MANUFACTURING SEPARATOR USING THE SAME

(71) Applicants: W-SCOPE KOREA CO., LTD., Cheongju-si (KR); W-SCOPE CHUNGJU PLANT CO., LTD., Chungju-si (KR)

(72) Inventors: Kyoung Sun Ryu, Cheongju-si (KR); Won Keun Choi, Cheongju-si (KR); Kwang Ho Choi, Cheongju-si (KR); Pyung Yong Park, Cheongju-si (KR); Byung Hyun Kim, Cheongju-si (KR)

(73) Assignees: W-SCOPE KOREA CO., LTD., Cheongju-si (KR); W-SCOPE CHUNGJU PLANT CO., LTD., Cheongju-si (KR)

( * ) Notice: Subject to any disclaimer, the term of this patent is extended or adjusted under 35 U.S.C. 154(b) by 211 days.

(21) Appl. No.: 17/856,437

(22) Filed: Jul. 1, 2022

(65) Prior Publication Data
US 2023/0207961 A1    Jun. 29, 2023

(30) Foreign Application Priority Data
Dec. 29, 2021    (KR) .................. 10-2021-0191331

(51) Int. Cl.
H01M 50/406    (2021.01)
H01M 50/417    (2021.01)
H01M 50/449    (2021.01)

(52) U.S. Cl.
CPC ....... *H01M 50/406* (2021.01); *H01M 50/417* (2021.01); *H01M 50/449* (2021.01)

(58) Field of Classification Search
CPC . H01M 50/417; H01M 50/403; B29C 55/065; B29C 48/0018
See application file for complete search history.

(56) References Cited

U.S. PATENT DOCUMENTS 5,691,077 A    11/1997    Yu
2017/0084898 A1    3/2017    Stokes et al.

FOREIGN PATENT DOCUMENTS

KR    10-2017-0118748 A        10/2017
KR        20170118748 A    *    10/2017
(Continued)

OTHER PUBLICATIONS

An Office Action mailed by the Korean Intellectual Property Office on Jul. 8, 2024, which corresponds to Korean Patent Application No. 10-2021-0191331 and is related to U.S. Appl. No. 17/856,437.

*Primary Examiner* — Daniel McNally
(74) *Attorney, Agent, or Firm* — Studebaker & Brackett PC

(57) ABSTRACT

One aspect of the present invention provides a stretching apparatus for manufacturing a separator including a first stretching machine and a second stretching machine arranged in parallel with each other, in which the first stretching machine includes a plurality of first unit sections having different stretching ratios, and the second stretching machine includes a plurality of second unit sections having different stretching ratios, the overall stretching ratio by each of the first stretching machine and the second stretching machine is the same each other, and at least one stretching ratio of the first unit section and at least one stretching ratio of the second unit section are different from each other and a method of manufacturing a separator using the same.

11 Claims, 3 Drawing Sheets

(56) References Cited

FOREIGN PATENT DOCUMENTS

KR 102100433 B1 * 4/2020
WO 2021/153792 A1 8/2021

* cited by examiner

-- Prior Art --

STRETCHING APPARATUS FOR MANUFACTURING SEPARATOR AND METHOD OF MANUFACTURING SEPARATOR USING THE SAME

CROSS-REFERENCE TO RELATED APPLICATION

This application claims priority to and the benefit of Korean Patent Application No. 10-2021-0191331, filed on Dec. 29, 2021, the disclosure of which is incorporated herein by reference in its entirety.

BACKGROUND

1. Field of the Invention

The present invention relates to stretching apparatus for manufacturing a separator and method of manufacturing a separator using the same.

2. Discussion of Related Art

Lithium secondary batteries are widely used as power sources for various electric products that are required to be miniaturized and lightweight, such as smart phones, notebook-sized personal computers, and tablet PCs, and as the fields of application thereof have expanded to smart grids and heavy-duty batteries for electric vehicles, the development of lithium secondary batteries having a large capacity, a long life, and high stability has been demanded.

As a means for achieving the above-mentioned object, a microporous separator using a microporous membrane formed with micropores that separates a positive electrode and a negative electrode to prevent an internal short circuit and allow lithium ions to move smoothly in a charging and discharging process, particularly a polyolefin such as polyethylene which is advantageous for pore formation by thermally induced phase separation and which is economical and easy to satisfy the physical properties required for the separator, has been developed in many ways.

The manufacturing process of a separator for a lithium secondary battery can be divided into wet and dry methods based on a method for forming pores, and most commercially available separators are manufactured by wet method. In addition, in the case of the wet process, a process of stretching a sheet or film, which is an intermediate of the separator, is performed prior to selectively extracting and removing a predetermined pore former kneaded with a resin to form pores. Such stretching is divided into uniaxial stretching and biaxial stretching based on the direction, and among them, biaxial stretching is divided into sequential biaxial stretching and simultaneous biaxial stretching based on the order, and sequential biaxial stretching is generally applied.

In the case of the biaxial stretching, compared to other processes constituting the wet process, since physical and human burdens for facilities and processes are large, and the resulting effect on the productivity of the separator is also relatively large, research and development in the direction of increasing the productivity of the separator by optimizing the stretching process such as overlapping two or more sheets or films and stretching them at the same time is also being actively carried out.

Japanese Registration Patent No. 4021266 discloses a method for manufacturing two microporous membranes by overlapping a plurality of extruded, casted sheets, simultaneous biaxial stretching, extraction, heat-setting, and then releasing the overlapped state, i.e., by dividing the overlapped intermediate, which is characterized in that a gas is injected or a liquid is applied between the sheets when the intermediate is overlapped so as to be easily divided. However, since a process for introducing a gas and a liquid between the sheets has to be added, there is a limit to improving productivity and economic efficiency, and there is the problem that the thickness of the microporous membrane produced by division that is not precisely controlled is not uniform or poor in appearance. In particular, in the case of a liquid applied between the sheets at the time of overlapping, there is a problem in that it is extracted with the pore former in a process for extracting the pore former so as to significantly lower the reusability of the extraction solvent or make it impossible to reuse it.

Korean Patent Registration No. 10-2100433 discloses a method of manufacturing a separator by overlapping and dividing an intermediate by the method according to FIG. 1. Referring to FIG. 1, the method includes manufacturing two intermediates through simultaneous biaxial stretching, extraction, and heat-setting, respectively, and then sequentially biaxially stretching and dividing the intermediates in a state of overlapping them. In this case, four or more stretching apparatuses are used to manufacture two separators, which means that more stretching apparatuses are required to manufacture one separator compared to the related art. This method can be effective only when manufacturing a separator having a weak mechanical strength with a thickness of about 0.1 to 5 μm.

Japanese Patent Registration No. 5541966 discloses a multi-layer sheet manufactured by co-extrusion, of which the intermediate layer is a pore-free, so-called, non-porous film, which provides adequate releasability when dividing the microporous film manufactured on both sides thereof. However, the non-porous membrane constituting the intermediate layer cannot be used as a separator for a lithium secondary battery and is inevitably discarded, and even in this case, since the cost for the raw materials and the steps required for the production and disposal of the intermediate layer are added, there is room for improvement in terms of productivity and economic efficiency.

SUMMARY OF THE INVENTION

The present invention is to solve the problems of the related art described above, and an object of the present invention is to provide a stretching apparatus for manufacturing a separator capable of achieving and improving the productivity and the quality of the separator in a balanced manner at the time of simultaneous production of two separators by overlapping (lamination) of sheets, stretching and dividing the sheets, and a method of manufacturing the separator using the same.

One aspect of the present invention provides a stretching apparatus for manufacturing a separator including a first stretching machine and a second stretching machine arranged in parallel with each other, in which the first stretching machine includes a plurality of first unit sections having different stretching ratios, and the second stretching machine includes a plurality of second unit sections having different stretching ratios, the overall stretching ratio by each of the first stretching machine and the second stretching machine is the same each other, and at least one stretching ratio of the first unit section and at least one stretching ratio of the second unit section are different from each other.

In one embodiment, the first stretching machine may include three or more rolls, and the first unit section may be formed between two rolls that rotate at different speeds and are adjacent to each other.

In one embodiment, the second stretching machine may include three or more rolls, and the second unit section may be formed between two rolls that rotate at different speeds and are adjacent to each other.

In one embodiment, the first stretching machine includes a first increase section in which the stretching ratio for each first unit section is increased, and a first reduction section in which the stretching ratio for each of the first unit section is reduced, the first increase section and the first reduction section may be continuously positioned.

In one embodiment, the second stretching machine includes a second increase section in which the stretching ratio for each second unit section is increased, and a second reduction section in which the stretching ratio for each second unit section is reduced, the second increase section and the second reduction section may be continuously positioned.

In one embodiment, the increase rate of the stretching ratio in the first and the second increase sections may be 200% or less, and the reduction rate of the stretching ratio in the first and the second reduction sections may be 100% or less.

In one embodiment, the stretching ratio by each of the first and the second unit section may be 1 to 5 times.

In one embodiment, a stretching apparatus for manufacturing a separator may further include a laminating machine positioned at the rear end of the first and the second stretching machines to laminate each film that has passed through the first and the second stretching machines for conversion into a laminate, and a third stretching machine positioned at the rear end of the laminating machine to stretch the laminate in a direction perpendicular to the stretching direction by the first and the second stretching machines.

Another aspect of the present invention provides a method of manufacturing a separator, using the stretching apparatus for manufacturing the separator, including: (a) extruding a first composition including a first polyolefin and a first pore former to manufacture a first sheet; (b) extruding a second composition including a second polyolefin and a second pore former to manufacture a second sheet; (c) manufacturing first and second precursor films by inputting the first and the second sheets into the first and the second stretching machines, respectively, and stretching them in the machine direction (MD); (d) laminating the first and the second precursor films to obtain a laminate; (e) after stretching the laminate in the transverse direction (TD), removing the first and the second pore formers from the laminate; and (f) dividing the laminate into two separators along the interface formed by the lamination.

In one embodiment, the peel strength of the laminate in step (f) may be 0.06 kgf/15 mm or less.

In one embodiment, the absolute value of the difference in air permeability (Gurley, sec/100 ml) between the two separators divided in step (f) may be 10 sec/100 ml or less.

Effects of the Invention

A stretching apparatus for manufacturing a separator according to an aspect of the present invention includes a first stretching machine and a second stretching machine arranged in parallel with each other, in which the first stretching machine includes a plurality of first unit sections having different stretching ratios, the second stretching machine includes a plurality of second unit sections having different stretching ratios, the overall stretching ratio by the first and the second stretching machines is the same, and at least one stretching ratio of the first unit section and at least one stretching ratio of the second unit section are different from each other, so that the productivity and the quality of the separator can be realized in a balanced manner and improved in the simultaneous production of two separators by overlapping (laminating), stretching and dividing the sheets.

The effect of one aspect of the present specification is not limited to the above-described effect, but it should be understood to include all effects that can be inferred from the configuration described in the detailed description or claims of the present invention.

DETAILED DESCRIPTION OF EXEMPLARY EMBODIMENTS

Figure 1:
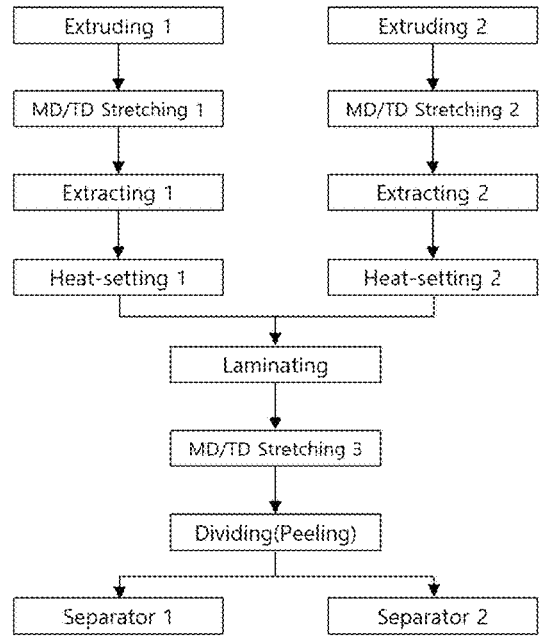
FIG. 1 shows a method of manufacturing a separator according to the related art.

Hereinafter, embodiments of the present invention will be described with reference to the accompanying drawings. However, the present invention may be implemented in several different forms, and thus is not limited to the embodiments described herein. In order to clearly illustrate the present invention in the drawings, parts irrelevant to the description are omitted, and the same reference numerals are added to the same or similar parts throughout the specification.

Throughout the specification, when a part is "connected" with another part, this includes not only the case where it is "directly connected" but also the case where it is "indirectly connected" with another member interposed therebetween. In addition, when a part is said to "include" a component, this means that other components may be further included, not excluded, unless specifically stated otherwise.

Hereinafter, embodiments of the present invention will be described in detail with reference to the accompanying drawings.

Stretching Apparatus for Manufacturing Separator

Figure 2:
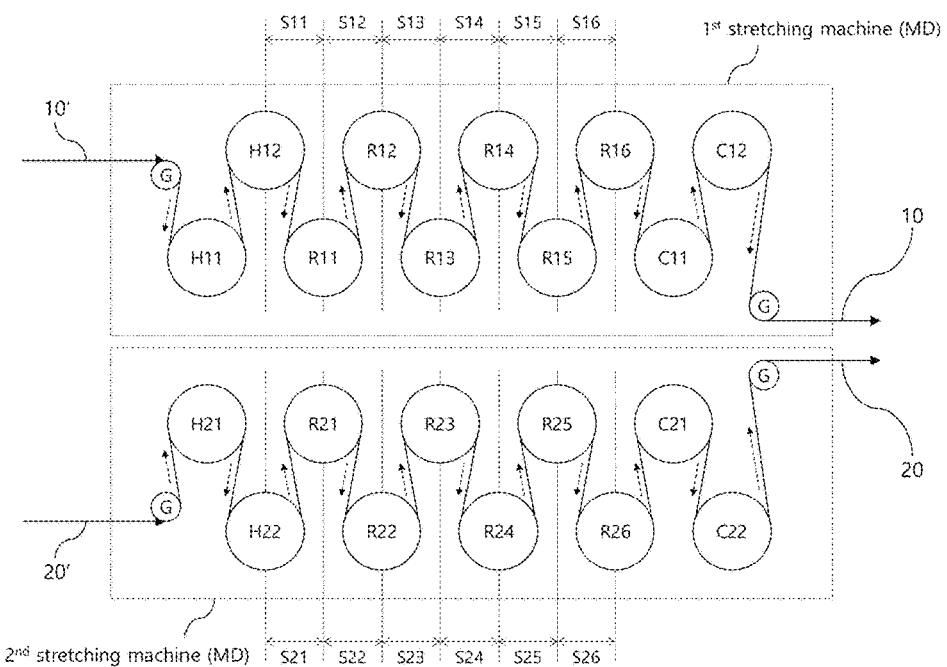
FIG. 2 shows a stretching apparatus for manufacturing a separator according to an embodiment of the present invention.

FIG. 2 shows a stretching apparatus for manufacturing a separator according to an embodiment of the present invention. Referring to FIG. 2, in the stretching apparatus for manufacturing a separator according to an embodiment of the present invention, a first stretching machine and a second stretching machine arranged in parallel with each other are included, the first stretching machine includes a plurality of first unit sections having different stretching ratios, the second stretching machine includes a plurality of second unit sections having different stretching ratios, the overall stretching ratio by the first and the second stretching machines is the same, and at least one stretching ratio of the first unit section and at least one stretching ratio of the second unit section are different from each other.

The first and the second stretching machines may be installed at the rear end of a device or equipment such as an extruder and T-die, which extrudes a resin composition in a process line for manufacturing a separator to discharge a gel-like sheet. The first and the second stretching machines are arranged in parallel to each other, and a device or equipment such as an extruder or T-die arranged in parallel with each other may be arranged at the front end of the first and the second stretching machines. Each sheet discharged through the extruder and the T-die arranged in parallel with each other may be input into the first and the second stretching machines.

The first and the second stretching machines are devices for stretching the sheet discharged from the extruder and the T-die, respectively, along the conveying direction of the sheet in the process line, and the sheet stretching direction by the first and the second stretching machines can be defined as the machine direction (MD).

The first stretching machine can include a plurality of first unit sections having different stretching ratios. The first stretching machine may include three or more, preferably, four or more, more preferably, six or more rolls (stretching rolls) installed sequentially and serially along the conveying direction of the sheet therein, and the first unit section may be formed between two rolls that rotate at different speeds and are adjacent to each other.

The stretching of the sheet in each of the first unit sections may be achieved by a difference in rotation speed between two adjacent rolls. For example, when the rotation speed of the roll located at the rear end of the two adjacent rolls is higher than the roll located at the front end, the sheet may be stretched in the machine direction at a stretching ratio by the difference in the rotation speed between the two rolls.

The first stretching machine may include a plurality of first unit sections having different stretching ratios. When three or more stretching rolls are provided, the first stretching machine may include two or more first unit sections provided between two adjacent rolls, and the stretching ratio of the first unit section, i.e., the stretching ratio at which the sheet is stretched in each first unit section, may be different.

The first stretching machine may include a first increase section in which the stretching ratio for each first unit section is increased, and a first reduction section in which the stretching ratio for each first unit section is reduced, and each of the first increase section and the first reduction section may be sequentially and continuously positioned inside the first stretching unit. That is, in the first stretching machine, the stretching ratio for each first unit section of the sheet may gradually increase and then gradually reduce, which can be realized by gradually increasing and then gradually reducing the difference in rotation speed between two adjacent rolls among the stretching rolls arranged in series.

The second stretching machine may include a plurality of second unit sections having different stretching ratios. The second stretching machine may include three or more, preferably, four or more, more preferably, six or more rolls (stretching rolls) installed sequentially and serially along the conveying direction of the sheet therein, and the second unit section may be formed between two rolls that rotate at different speeds and are adjacent to each other.

The stretching of the sheet in each of the second unit sections may be achieved by a difference in rotation speed between two adjacent rolls. For example, when the rotation speed of the roll located at the rear end of the two adjacent rolls is higher than the roll located at the front end, the sheet may be stretched in the machine direction at a stretching ratio by the difference in the rotation speed between the two rolls.

The second stretching machine can include a plurality of second unit sections having different stretching ratios. When three or more stretching rolls are provided, the second stretching machine may include two or more second unit sections provided between two adjacent rolls, and the stretching ratio of the second unit section, i.e., the stretching ratio at which the sheet is stretched in each second unit section, may be different.

The second stretching machine may include a second increase section in which the stretching ratio for each second unit section is increased, and a second reduction section in which the stretching ratio for each second unit section is reduced, and each of the second increase section and the first reduction section may be sequentially and continuously positioned inside the second stretching unit. That is, in the second stretching machine, the stretching ratio for each first unit section of the sheet may gradually increase and then gradually reduce, which can be realized by gradually increasing and then gradually reducing the difference in rotation speed between two adjacent rolls among the stretching rolls arranged in series.

The increase rate of the stretching ratio in the first and the second increase sections may be 200% or less, preferably, 180% or less, more preferably, 150% or less, and the reduction rate of the stretching ratio in the first and the second reduction sections may be 100% or less, preferably 80% or less, more preferably 50% or less. In the first and the second stretching machines, when the increase rate of the stretching ratio exceeds 200% or the reduction rate exceeds 100%, the morphology of the pores formed by stretching becomes non-uniform, and the sheet may be damaged or broken during stretching.

As used herein, the terms "increase rate" and "reduction rate" of the stretching ratio means a rate of change of a stretching ratio between two first unit sections disposed consecutively adjacent to each other in the first increase section and the first reduction section, and can be interpreted in the same sense for the second increase section, the second reduction section and a second unit section. Specifically, when two first unit sections (or second unit sections) disposed continuously adjacent to each other are referred to as a front unit section and a rear unit section, respectively, the rate of change may be calculated by the following equation.

$$\text{Change rate (\%)} = \frac{(\text{Stretching ratio of the rear unit section}) - (\text{Stretching ratio of the front unit section})}{(\text{Stretching ratio of the front unit section})} * 100 \quad \langle\text{Equation}\rangle$$

The stretching ratio by each of the first and the second unit section may be 1 to 5 times, preferably 1.01 to 3 times, and more preferably, 1.02 to 2.8 times. When the stretching ratio by each of the first and the second unit section is more than 5 times, the morphology of pores formed by stretching may become non-uniform, and the sheet may be damaged or broken during stretching.

The overall stretching ratio by each of the first and the second stretching machines may be the same, but at least one stretching ratio of the first unit section and at least one stretching ratio of the second unit section may be different from each other. The overall stretching ratio by the first and the second stretching machines may be 2 to 20 times, preferably, 3 to 15 times, more preferably, 3 to 10 times, but is not limited thereto. The overall stretching ratio of the first stretching machine is a value obtained by multiplying all the stretching ratios of the first unit sections and the overall stretching ratio of the second stretching machine is a value obtained by multiplying all the stretching ratios of the second unit sections The overall stretching ratios of the sheets by the first and the second stretching machines are fixed to the same value, but by setting the rotation speed of the rolls included in the first and the second stretching machines, and accordingly, the rate of increase and/or decrease of the stretching ratio per unit section to be different from each other, it is possible to impart a fine difference to the structure, orientation, and the like of the polymer resin and the pores included in each of the sheets stretched in the machine direction (MD) by the second and first stretching machines.

In the sheets stretched by the first or second stretching machine, when a minute difference occurs in the structure, orientation, and the like of the polymer resin and the pores constituting the respective precursor films, it is possible to secure the mold releasability necessary for smoothly dividing the laminate along the interface without interposing any material or substance such as a mold release agent or release film at the interface of the laminate in which the precursor films are overlapped and laminated.

A stretching apparatus for manufacturing a separator may further include a laminating machine positioned at the rear end of the first and the second stretching machines to laminate each film that has passed through the first and the second stretching machines for conversion into a laminate, and a third stretching machine positioned at the rear end of the laminating machine to stretch the laminate in a direction perpendicular to the stretching direction by the first and the second stretching machines.

The laminating machine is a device or equipment for laminating two sheets stretched by the first and the second stretching machines, and the lamination may be achieved by pressing the two sheets, and physical means such as heating, ultrasound (high frequency), and laser may be further mobilized during the pressing.

The laminate may be transferred to the third stretching machine located at the rear end of the laminating machine, and the third stretching machine may stretch the laminate in in a direction perpendicular to the stretching direction by the first and the second stretching machines, that is, a direction perpendicular to the machine direction MD, that is, a transverse direction (TD). The stretching ratio along the transverse direction (TD) of the laminate by the third stretching machine may be 2 to 20 times, preferably, 3 to 15 times, more preferably, 3 to 10 times, but is not limited thereto.

At least one heating roll and a cooling roll may be further provided at the front and rear ends of the stretching roll, respectively. The heating roll may provide flexibility to the sheet so that it can be smoothly stretched, and the cooling roll may stabilize the structure of the stretched sheet. In general, the sheet is heated and cooled between the heating roll and the cooling roll, respectively, and transferred to the rear end thereof, and when necessary, the sheet may be stretched in the machine direction (MD) at a predetermined ratio in the corresponding section.

Method of Manufacturing Separator

Figure 3:
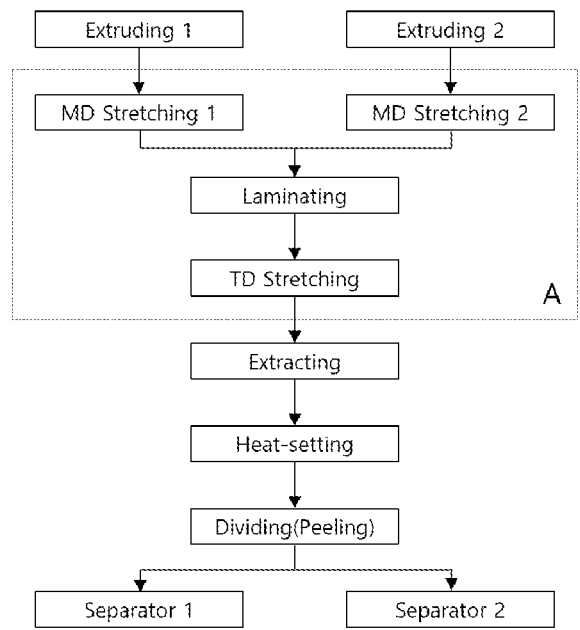
FIG. 3 shows a method of manufacturing a separator according to an embodiment of the present invention.

FIG. 3 shows a method of manufacturing a separator according to an embodiment of the present invention. Referring to FIG. 3, a method of manufacturing a separator according to another embodiment of the present invention using a stretching apparatus for manufacturing a separator may include: (a) extruding a first composition including a first polyolefin and a first pore former to manufacture a first sheet; (b) extruding a second composition including a second polyolefin and a second pore former to manufacture a second sheet; (c) inputting the first and the second sheets into the first and the second stretching machines, respectively, and stretching them in the machine direction (MD) to manufacture first and second precursor films; (d) laminating the first and the second precursor films to obtain a laminate; (e) removing the first and the second pore formers from the laminate after stretching the laminate in the transverse direction (TD); and (f) dividing the laminate into two separators along the interface formed by the lamination.

A first sheet may be manufactured by extruding the first composition including the first polyolefin and the first pore former in step (a) and discharging it through a T-die, and a second sheet may be manufactured by extruding the second composition including the second polyolefin and the second pore former in step (b). The first and the second sheets may be simultaneously manufactured by an extruder and a T-die arranged in parallel with each other.

The weight average molecular weight (Mw) of the first and the second polyolefins may be 300,000 to 2,000,000, preferably, 300,000 to 1,000,000, more preferably, 300,000 to 700,000, and a molecular weight distribution (Mw/Mn) may be 3 to 7. When the molecular weight distribution of the first and the second polyolefins is less than 3, the dispersibility with the pore former may be lowered, thereby reducing the uniformity of the manufactured separator, and when it exceeds 7, the mechanical properties of the separator may be reduced.

Each of the first and the second polyolefins may be one selected from the group consisting of polyethylene, polypropylene, polybutylene, polymethylpentene, ethylene vinyl acetate, ethylene butyl acrylate, ethylene ethyl acrylate, and a combination of two or more thereof, preferably polyethylene and/or polypropylene, more preferably polyethylene, but is not limited thereto.

The pore former may be one selected from the group consisting of paraffin oil, paraffin wax, mineral oil, solid paraffin, soybean oil, rapeseed oil, palm oil, di-2-ethylhexyl phthalate, dibutyl phthalate, diisononyl phthalate, diisodecyl phthalate, bis(2-propylheptyl)phthalate, naphthenoyl, and a combination of two or more thereof, preferably paraffin oil, and more preferably, paraffin oil having a kinematic viscosity of 50 to 100 cSt at 40° C., but is not limited thereto. Each of the first and the second compositions may include 20 to 50% by weight of the first and the second polyolefins and 50 to 80% by weight of the pore former.

Figure 4:
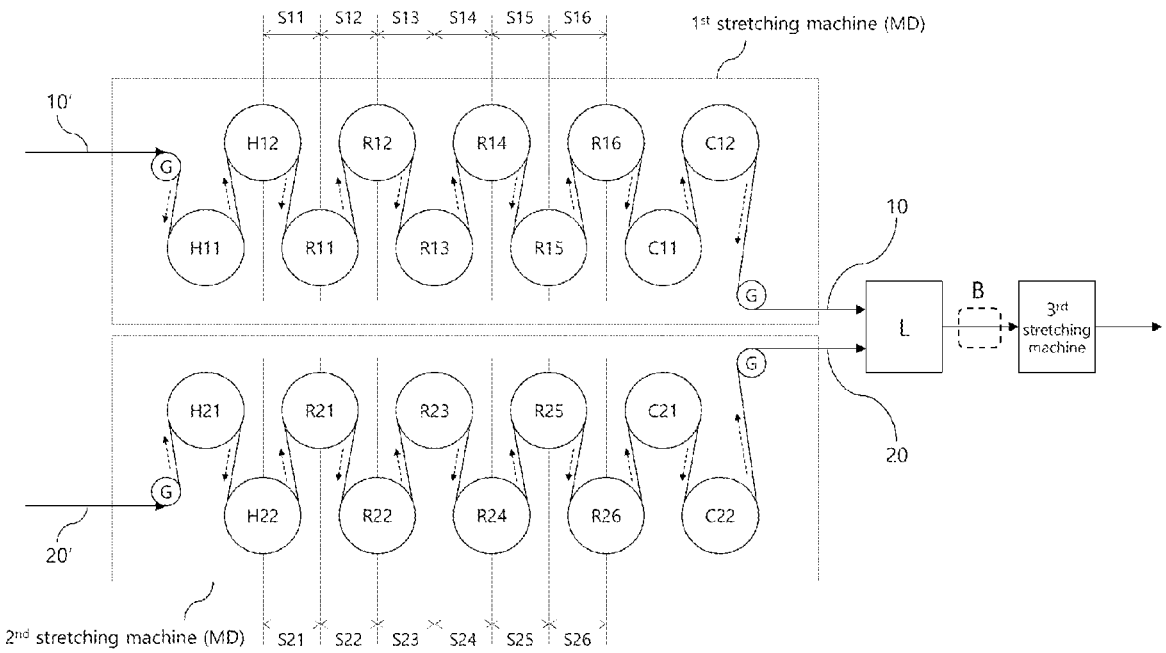
FIG. 4 shows a stretching apparatus for manufacturing a separator used in part A of FIG. 3.

FIG. 4 shows a stretching apparatus for manufacturing a separator used in part A of FIG. 3. Referring to FIG. 4, in step (c), the first and the second sheets may be input into the first and the second stretching machines, respectively, and stretched in the machine direction (MD) to manufacture first and second precursor films.

The overall stretching ratios of the first and the second sheets by the first and the second stretching machines are fixed to the same value, but by setting the rotation speed of the rolls included in the first and the second stretching machines and accordingly, the rate of increase and/or decrease of the stretching ratio per unit section to be different from each other, it is possible to impart a fine difference to the structure, orientation, and the like of the polymer resin and the pores included in each of the first or second precursor films stretched in the machine direction (MD) by the second and first stretching machines. In addition, the configuration, operation and effect of the first and the second stretching machines are the same as those described above.

In step (d), a laminate may be obtained by laminating the first and the second precursor films. In the first and the second precursor films stretched by the first or second stretching machine, when a minute difference occurs in the structure, orientation, and the like of the polymer resin and the pores constituting the respective precursor films, it is possible to secure the mold releasability necessary for smoothly dividing the laminate along the interface without interposing any material or substance such as a mold release agent or release film at the interface of the laminate in which the precursor films are overlapped and laminated.

The lamination may be achieved by the above-described laminating machine. Specifically, the lamination may be achieved by pressing the two sheets, and physical means such as heating, ultrasound (high frequency), and laser may be further mobilized during the pressing.

After stretching the laminate in the transverse direction (TD) in step (e), the first and the second pore formers may be removed from the laminate. The transverse direction (TD) stretching of the laminate may be performed by the third stretching machine.

The third stretching machine may stretch the laminate in a direction perpendicular to the stretching direction by the first and the second stretching machines, that is, a direction perpendicular to the machine direction MD, that is, a transverse direction (TD). The stretching ratio along the transverse direction (TD) of the laminate by the third stretching machine may be 2 to 20 times, preferably, 3 to 15 times, more preferably, 3 to 10 times, but is not limited thereto.

The laminate can be selectively extracted and removed at the same time from the laminate by applying a predetermined extraction solvent, specifically, from the first and the second precursor films constituting the laminate. The first and the second pore formers may be extracted and removed by immersing the laminate for a predetermined time in an impregnation bath in which a solution including the extraction solvent is accommodated.

The content of the pore former remaining on the surface and/or inside of the laminate after extraction may be 1% by weight or less. The extraction solvent may be, for example, methyl ethyl ketone, hexane, dichloromethane, or the like, but is not limited thereto.

The time required for extraction and removal of the first and the second pore formers may be determined by the thickness and porosity of the laminate, but when the thickness and porosity of the laminate are 10 to 30 μm and 40 to 60 vol %, respectively, it may be 10 minutes or less, preferably 5 minutes or less, and more preferably, 1 minute or less.

The extraction solvent remaining in the laminate may be removed by heating the laminate from which the first and the second pore formers have been extracted and removed. Some of the extraction solvent applied in step (e) may remain on the surface and/or inside of the laminate. Since the remaining extraction solvent may deteriorate the subsequent process and the physical properties of the separator manufactured through it, the extraction solvent remaining in the laminate may be removed by appropriately heating the laminate to a temperature greater than or equal to the boiling point of the extraction solvent.

In step (f), the laminate is divided into two separators along the interface formed by the lamination, that is, it can be divided into a first separator derived from the first sheet and the first precursor film, and a second separator derived from the second sheet and the second precursor film.

Figure 5:
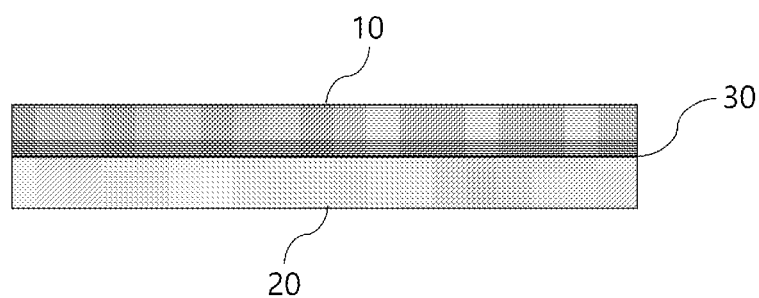
FIG. 5 shows a cross-section of a laminate corresponding to part B of FIG. 4.

FIG. 5 shows a cross-section of a laminate corresponding to part B of FIG. 4. Referring to FIG. 5, the interface formed by laminating the first and the second precursor films in step (d) may be stably maintained even in step (e), and the releasability imparted to the interface in step (d) can be further enhanced by transverse direction (TD) stretching of the laminate in step (e).

In step (f), the peel strength of the laminate measured at the interface when dividing may be 0.06 kgf/15 mm or less, preferably, 0.01 to 0.06 kgf/15 mm. When the peel strength of the laminate is greater than 0.06 kgf/15 mm, the division of the laminate may not be smoothly performed, and peeling, damage, etc. may be observed on the surfaces of the divided first and second separators. Conversely, when the peel strength of the laminate is less than 0.01 kgf/15 mm, the interlayer bonding force of the laminate laminated in step (d) is lowered, so that in steps (d) and (e), the structure of the laminate cannot be stably maintained, the physical properties of the first and the second separators divided in step (f) are significantly different, and the productivity and reliability of the product may be lowered.

The first and the second separators manufactured through steps (a) to (f) are manufactured by simultaneous stretching in the transverse direction (TD) through overlapping of the first and the second precursor films, and it is important to increase the productivity of the separator and at the same time minimize the difference in physical properties between two simultaneously manufactured separators. For example, the absolute value of the difference in air permeability (Gurley, sec/100 ml) between the two separators divided in step (f) may be 10 sec/100 ml or less, preferably, 8 sec/100 ml or less, more preferably, 5 seconds/100 ml or less.

Between steps (e) and (f), a step of heat-setting the laminate may be further included (e'). The heat-setting refers to a process of removing residual stress by forcibly holding the laminate to be contracted by applying heat while the laminate is fixed. A high heat-setting temperature is advantageous for lowering the shrinkage rate, but when the temperature is excessively high, the pores formed by partially melting the laminate may be closed, thereby reducing transmittance.

The heat-setting temperature is preferably selected in a range where 10 to 30% by weight of the crystalline portion of the laminate is melted. When the heat-setting temperature is selected in the above range, it is possible to prevent the problem of not having the effect of removing the residual stress of the film due to insufficient rearrangement of the polyolefin molecules in the laminate, and the problem of reducing transmittance due to occlusion of pores due to partial melting. For example, the heat-setting temperature may be 120 to 140° C., preferably, 123 to 135° C., and the heat-setting time may be 5 seconds to 1 minute.

Steps (a) to (f) constituting the method of manufacturing the separator may be performed continuously without any discontinuity or interruption between two or more of them, and through this, the continuity of the process can be maintained to further improve productivity.

Hereinafter, examples of the present specification will be described in more detail.

Example 1

A raw material obtained by mixing 30 parts by weight of high-density polyethylene (HDPE) having a weight average molecular weight (Mw) of 350,000 and a molecular weight distribution (Mw/Mn) of 5 and 70 parts by weight of paraffin oil having a kinematic viscosity of 70 cSt at 40° C. was put into a twin-screw extruder (inner diameter: 58 mm, L/D=56). After discharging from the first extruder to a T-die having a width of 300 mm under conditions of a screw rotation speed of 40 rpm and 200° C., it was passed through a casting roll having a temperature of 40° C. to manufacture a first sheet having a thickness of 800 μm.

The same raw material was put into a twin-screw extruder (second extruder, inner diameter 58 mm, L/D=56). After discharging from the second extruder to a T-die having a width of 300 mm under conditions of a screw rotation speed of 40 rpm and 200° C., it was passed through a casting roll having a temperature of 40° C. to manufacture a second sheet having a thickness of 800 μm.

In order to stretch the first and the second sheets in the machine direction (MD), the first and the second stretching machines were arranged in parallel with each other, respectively. In the first and the second stretching machines, two heating rolls, six stretching rolls, and two cooling rolls are sequentially installed, respectively, and six unit sections having different stretching ratios are provided at the front end of each stretching roll (FIG. 2 and FIG. 4). The first and the second sheets were by stretched at a predetermined ratio in the machine direction (MD) to manufacture first and second precursor films, respectively. The stretching ratio for each unit section and overall stretching ratio in the first and the second stretching machines are shown in Table 1 below.

TABLE 1

| Classification | Stretching ratio | Stretching ratio | Stretching ratio | Stretching ratio | Stretching ratio | Stretching ratio | Overall stretching ratio |
|---|---|---|---|---|---|---|---|
| First stretching machine | 1.00 (S11) | 1.10 (S12) | 1.12 (S13) | 1.30 (S14) | 1.90 (S15) | 1.05 (S16) | 3.2 |
| Second stretching machine | 1.00 (S21) | 1.03 (S22) | 1.08 (S23) | 1.20 (S24) | 2.20 (S25) | 1.10 (S26) | 3.2 |

The first and the second precursor films were put into a laminating machine installed at the rear end of the first and the second stretching machines along a guide roll installed at the rear end of the cooling roll, and the first and the second precursor films were brought into surface contact and laminated to obtain a laminate.

The laminate was stretched 7 times in the transverse direction (TD) in a Tenter stretching machine at 125° C., and then immersed in a dichloromethane leaching bath at 25° C. for 1 minute to extract and remove paraffin oil, and dried at 50° C. for 5 minutes. After heat-setting by relaxing the laminate by 10% in the transverse direction (TD) at 130° C., the laminate was divided along the interface formed by the lamination among the laminates into first and second separators derived from the first and the second sheets, respectively.

Example 2

First and second separators were obtained in the same manner as in Example 1, except that the stretching ratio for each unit section and the overall stretching ratio were changed in the first and the second stretching machines. The stretching ratio for each unit section and overall stretching ratio in the first and the second stretching machines are shown in Table 2 below.

TABLE 2

| Classification | Stretching ratio | Stretching ratio | Stretching ratio | Stretching ratio | Stretching ratio | Stretching ratio | overall stretching ratio |
|---|---|---|---|---|---|---|---|
| First stretching machine | 1.00 (S11) | 1.05 (S12) | 1.15 (S13) | 1.95 (S14) | 1.75 (S15) | 1.50 (S16) | 6.2 |
| Second stretching machine | 1.00 (S21) | 1.11 (S22) | 1.50 (S23) | 2.00 (S24) | 1.50 (S25) | 1.25 (S26) | 6.2 |

Example 3

First and second separators were obtained in the same manner as in Example 1, except that the thickness of the first and the second sheets was changed to 1,000 μm, respectively, and the stretching ratio for each unit section and the overall stretching ratio were changed in the first and the second stretching machines. The stretching ratio for each unit section and overall stretching ratio in the first and the second stretching machines are shown in Table 3 below.

TABLE 3

| Classification | Stretching ratio | Stretching ratio | Stretching ratio | Stretching ratio | Stretching ratio | Stretching ratio | Overall stretching ratio |
|---|---|---|---|---|---|---|---|
| First stretching machine | 1.00 (S11) | 1.05 (S12) | 1.10 (S13) | 2.70 (S14) | 2.30 (S15) | 1.40 (S16) | 10.0 |
| Second stretching machine | 1.00 (S21) | 1.02 (S22) | 1.07 (S23) | 2.65 (S24) | 2.10 (S25) | 1.65 (S26) | 10.0 |

Comparative Example 1

A raw material obtained by mixing 40 parts by weight of high-density polyethylene (HDPE) having a weight average molecular weight (Mw) of 350,000 and a molecular weight distribution (Mw/Mn) of 5 and 40 parts by weight of paraffin oil having a kinematic viscosity of 70 cSt at 40° C. was put into a twin-screw extruder (inner diameter: 58 mm, L/D=56). After discharging from the first extruder to a T-die having a width of 300 mm at a screw rotation speed of 40 rpm and 200° C., it was passed through a casting roll having a temperature of 40° C. to manufacture a first sheet having a thickness of 500 μm, and a second sheet was manufactured using the same method.

After glycerin was applied between the first and the second sheets, the first and the second sheets were overlapped to obtain a laminate. The laminate was stretched 7×7 times (MD×TD) with a simultaneous biaxial stretching machine at 120° C., and then immersed in a dichloromethane leaching bath at 25° C. for 1 minute to extract and remove paraffin oil, and dried at 50° C. for 5 minutes. The laminates were divided along the interfaces formed by the overlapping among the laminates into first and second separators derived from the first and the second sheets, respectively.

Comparative Example 2

First and second separators were obtained in the same manner as in Comparative Example 1, except that, when the first and the second sheets were overlapped, glycerin was not applied between the first and the second sheets, and a polypropylene sheet having a thickness of 0.2 mm was interposed.

Comparative Example 3

First and second separators were obtained in the same manner as in Example 3, except that when laminating the first and the second precursor films, glycerin was applied between the first and the second precursor films, and the stretching ratio for each unit section and overall stretching ratio in the first and the second stretching machines were changed as shown in Table 4 below.

TABLE 4

| Classification | Stretching ratio | Stretching ratio | Stretching ratio | Stretching ratio | Stretching ratio | Stretching ratio | Overall stretching ratio |
|---|---|---|---|---|---|---|---|
| First stretching machine | 1.00 (S11) | 1.05 (S12) | 1.10 (S13) | 2.70 (S14) | 2.30 (S15) | 1.40 (S16) | 10.0 |
| Second stretching machine | 1.00 (S21) | 1.05 (S22) | 1.10 (S23) | 2.70 (S24) | 2.30 (S25) | 1.40 (S26) | 10.0 |

Comparative Example 4

First and second separators were obtained in the same manner as in Comparative Example 3, except that glycerin was not applied between the first and the second precursor films when the first and the second precursor films were laminated.

Comparative Example 5

A raw material obtained by mixing 30 parts by weight of high-density polyethylene (HDPE) having a weight average molecular weight (Mw) of 350,000 and a molecular weight distribution (Mw/Mn) of 5 and 70 parts by weight of paraffin oil having a kinematic viscosity of 70 cSt at 40° C. was put into a twin-screw extruder (inner diameter: 58 mm, L/D=56). After discharging from the first extruder to a T-die having a width of 300 mm under conditions of a screw rotation speed of 40 rpm and 200° C., it was passed through a casting roll having a temperature of 40° C. to manufacture a first sheet having a thickness of 1000 μm.

The same raw material was put into a twin-screw extruder (second extruder, inner diameter 58 mm, L/D=56). After discharging from the second extruder to a T-die having a width of 300 mm under conditions of a screw rotation speed of 40 rpm and 200° C., it was passed through a casting roll having a temperature of 40° C. to manufacture a second sheet having a thickness of 1000 μm.

The first and the second sheets were put into a laminating machine installed at the rear end of the first and the second extruders, and the first and the second sheets were brought into surface contact and laminated to obtain a laminate.

The laminate was stretched 10 times in the machine direction (MD) in a roll stretching machine at 110° C., stretched 7 times in the transverse direction (TD) in a Tenter stretching machine at 125° C., and then immersed in a dichloromethane leaching bath at 25° C. for 1 minute to extract and remove paraffin oil. The laminate from which the paraffin oil was removed was dried at 50° C. for 5 minutes. After heat-setting by relaxing the laminate by 10% in the transverse direction (TD) at 130° C., the laminates were divided along the interfaces formed by the lamination among the laminates into the first and the second separators derived from the first and the second sheets, respectively.

Experimental Example 1

The physical properties of the first and the second separators obtained in Examples and Comparative Examples were measured as follows, and the results are shown in Table 5 below.

Thickness (μm): The thickness of the separator was measured using a micro-thickness measuring instrument.

Air permeability (Gurley, sec/100 ml): Using Asahi Seiko's EGO2-5 model as a Gurley meter (densometer), the time for 100 ml of air to pass through the separator was measured at a measurement pressure of 0.025 MPa.

TABLE 5

| Classification | Thickness (First separator/ Second separator) | Air permeability (First separator/ Second separator) |
|---|---|---|
| Example 1 | 8.2/8.4 | 99/105 |
| Example 2 | 7.9/8.4 | 102/105 |
| Example 3 | 8.7/9.0 | 98/101 |
| Comparative Example 1 | 9.7/9.3 | 182/170 |
| Comparative Example 2 | 9.2/8.1 | 210/179 |
| Comparative Example 3 | 8.5/8.1 | 157/145 |
| Comparative Example 4 | 8.5/8.1 | 110/128 |
| Comparative Example 5 | 7.1/8.9 | 128/139 |

Experimental Example 2

When dividing the laminate laminated in Examples and Comparative Examples, the peel strength of the first and the second separators were measured in the following way, and the results are shown in Table 6 below.

Peel strength (kgf/15 mm): After cutting the laminates according to Examples and Comparative Examples to a width of 15 mm and a length of 50 mm, the interface between the first and the second separators in the laminate was peeled off at a tensile rate of 0.3 m/min using Shimazu's UTM and measured, and the average value in a section of 20 to 40 mm in length is shown in Table 6 below.

Presence or absence of surface peeling: After dividing the laminate according to Examples and Comparative Examples, it was visually observed whether peeling, scratches, breakage, etc. occurred on the surfaces of the first and the second separators.

TABLE 6

| Classification | Peel strength | Surface peeling |
|---|---|---|
| Example 1 | 0.0203 | No |
| Example 2 | 0.0185 | No |
| Example 3 | 0.0118 | No |
| Comparative Example 1 | 0.0195 | Yes |
| Comparative Example 2 | 0.0615 | Yes |
| Comparative Example 3 | 0.0875 | Yes |
| Comparative Example 4 | 0.1500 | Yes |
| Comparative Example 5 | 0.0263 | Yes |

The foregoing description of the present invention is intended to be illustrative, and it will be understood by those skilled in the art that embodiments can be easily modified into other specific forms without changing the spirit and essential characteristics of the invention. Therefore, it should be understood that the embodiments described above are illustrative in all respects and not restrictive. For example, each component described as a single type may be implemented in a dispersed form, and likewise components described as distributed may be implemented in a combined form.

The scope of the present invention is indicated by the following claims, and all changes or modifications derived from the meaning and scope of the claims and their equivalents should be construed as being included in the scope of the present invention.

| Description of Marks in the Figures | |
|---|---|
| 10': First sheet | 20': second sheet |
| 10: First precursor film | 20: Second precursor Film |
| S11 to S16: First unit section | S21 to S26: Second unit section |
| R11 to R16, R21 to R26: Stretching roll | G: Guide roll |
| H11, H12, H21, H22: Heating roll | C11, C12, C21, C22: Cooling roll |
| L: Laminating machine | 30: Interface |

What is claimed is:

1. A stretching apparatus for manufacturing a separator, comprising:
    a first stretching machine and a second stretching machine arranged in parallel with each other,
    wherein the first stretching machine includes a plurality of first unit sections having different stretching ratios,
    the second stretching machine includes a plurality of second unit sections having different stretching ratios,
    an overall stretching ratio of the first stretching machine and an overall stretching ratio of the second stretching machine are the same,
    at least one stretching ratio of a first unit section and at least one stretching ratio of a second unit section are different from each other, and
    a rate of change of the stretching ratio between two first unit sections in the first stretching machine and a rate of change of the stretching ratio between two second unit sections in the second stretching machine are different from each other.

2. The stretching apparatus of claim 1, wherein
the first stretching machine includes a first increase section in which the stretching ratio for each of the first unit sections is increased, and a first reduction section in which the stretching ratio for each of the first unit sections is reduced, and
the first increase section and the first reduction section are continuously positioned.

3. The stretching apparatus of claim 2, wherein
the second stretching machine includes a second increase section in which the stretching ratio for each of the second unit sections is increased, and a second reduction section in which the stretching ratio for each of the second unit sections is reduced, and
the second increase section and the second reduction section are continuously positioned.

4. The stretching apparatus of claim 3, wherein
an increase rate of the stretching ratio in the first and the second increase sections is 200% or less, and
a reduction rate of the stretching ratio in the first and the second reduction sections is 100% or less.

5. The stretching apparatus of claim 4, wherein the stretching ratio by each of the first and the second unit section is 1 to 5 times.

6. The stretching apparatus of claim 1, wherein
the first stretching machine includes three or more rolls, and
the first unit section is formed between two rolls that rotate at different speeds and are adjacent to each other.

7. The stretching apparatus of claim 6, wherein
the second stretching machine includes three or more rolls, and
the second unit section is formed between two rolls that rotate at different speeds and are adjacent to each other.

8. The stretching apparatus of claim 1, further including:
a laminating machine positioned at a rear end of the first and the second stretching machines to laminate each film that has passed through the first and the second stretching machines for conversion into a laminate, and
a third stretching machine positioned at a rear end of the laminating machine to stretch the laminate in a direction perpendicular to the stretching direction by the first and the second stretching machines.

9. A method of manufacturing a separator using the stretching apparatus for manufacturing a separator of claim 1, including:
(a) extruding a first composition including a first polyolefin and a first pore former to manufacture a first sheet;
(b) extruding a second composition including a second polyolefin and a second pore former to manufacture a second sheet;
(c) inputting the first and the second sheets into the first and the second stretching machines, respectively, and stretching the first and the second sheets in the machine direction (MD) to manufacture first and second precursor films;
(d) laminating the first and the second precursor films to obtain a laminate;
(e) removing the first and the second pore formers from the laminate after stretching the laminate in the transverse direction (TD); and
(f) dividing the laminate into two separators along the interface formed by the lamination.

10. The method of claim 9, wherein the peel strength of the laminate in step (f) is 0.06 kgf/15 mm or less.

11. The method of claim 9, wherein the absolute value of the difference in air permeability (Gurley, seconds/100 ml) between the two separators divided in step (f) is 10 seconds/100 ml or less.

* * * * *